United States Patent [19]

Callahan

[11] 4,134,282

[45] Jan. 16, 1979

[54] MOTOR VEHICLE ANTI-THEFT DEVICE

[76] Inventor: Brian W. Callahan, 27 Adelaide St., Jamaica Plain, Mass. 02130

[21] Appl. No.: 811,522

[22] Filed: Jun. 30, 1977

[51] Int. Cl.$^2$ ............................................. B60R 25/02
[52] U.S. Cl. ........................................ 70/212; 70/237
[58] Field of Search ................. 70/209, 210, 211, 212, 70/213, 225, 226, 237, 238, 252

[56] References Cited

U.S. PATENT DOCUMENTS

| | | | |
|---|---|---|---|
| 1,140,141 | 5/1915 | Fagan | 70/211 |
| 1,296,085 | 3/1919 | Johnson | 70/211 X |
| 1,347,463 | 7/1920 | Jameson | 70/211 |
| 1,368,922 | 2/1921 | Gerfers | 70/212 |
| 1,452,240 | 4/1923 | Hamon | 70/211 |
| 2,485,997 | 10/1949 | Balais | 70/212 X |
| 2,716,336 | 8/1955 | Ross | 70/212 X |
| 3,245,239 | 4/1966 | Zaidner | 70/211 X |
| 3,462,982 | 8/1969 | Moore | 70/209 |
| 3,550,409 | 12/1970 | Pariser | 70/212 X |
| 3,742,743 | 7/1973 | Stoyanovitch | 70/225 X |

FOREIGN PATENT DOCUMENTS

| | | | |
|---|---|---|---|
| 513332 | 11/1930 | Fed. Rep. of Germany | 70/211 |
| 631708 | 6/1936 | Fed. Rep. of Germany | 70/211 |
| 521946 | 3/1921 | France | 70/212 |
| 620940 | 1/1927 | France | 70/212 |
| 269500 | 8/1927 | United Kingdom | 70/211 |
| 1127524 | 9/1968 | United Kingdom | 70/226 |

Primary Examiner—Thomas J. Holko
Attorney, Agent, or Firm—Walter J. Kreske

[57] ABSTRACT

A device for preventing the stealing of a motor vehicle of the type having a steering wheel mounted in front of a panel such as the instrument panel or dashboard of an automobile or motor boat. The device is comprised of a pair of steel legs covered with a bright non-scratching rubber or other plastic and extending from a common juncture to form an L shaped member with the legs being of a length and angular relation such that when the juncture is at the top of the steering wheel one of the legs extends from the top of the steering wheel rim and overlaps the top edge of the panel, and the other leg extends from the top of the steering wheel rim and overlaps the steering wheel hub; spaced apart holes through the other leg and adjacent to the juncture; a U shaped member for fitting about the steering wheel rim and having parallel sides extending through the holes and notches along the sides; and a key operated locking member having holes for receiving and locking onto the parallel sides at any of the notches and oriented for the key to be inserted from the juncture end of the leg.

9 Claims, 6 Drawing Figures

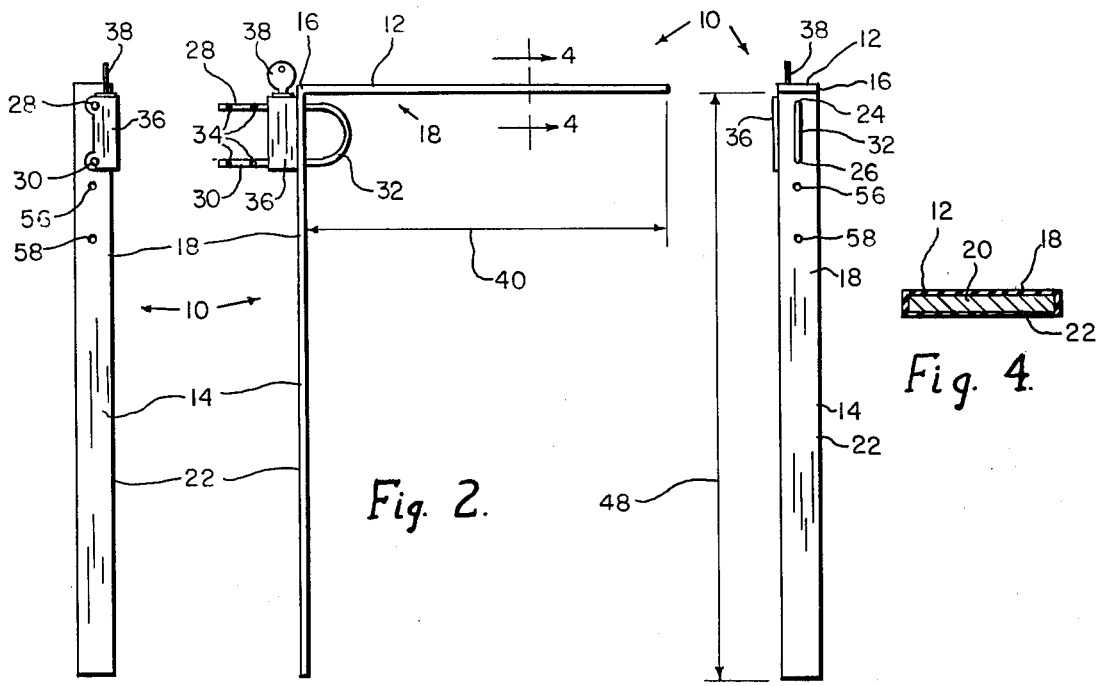
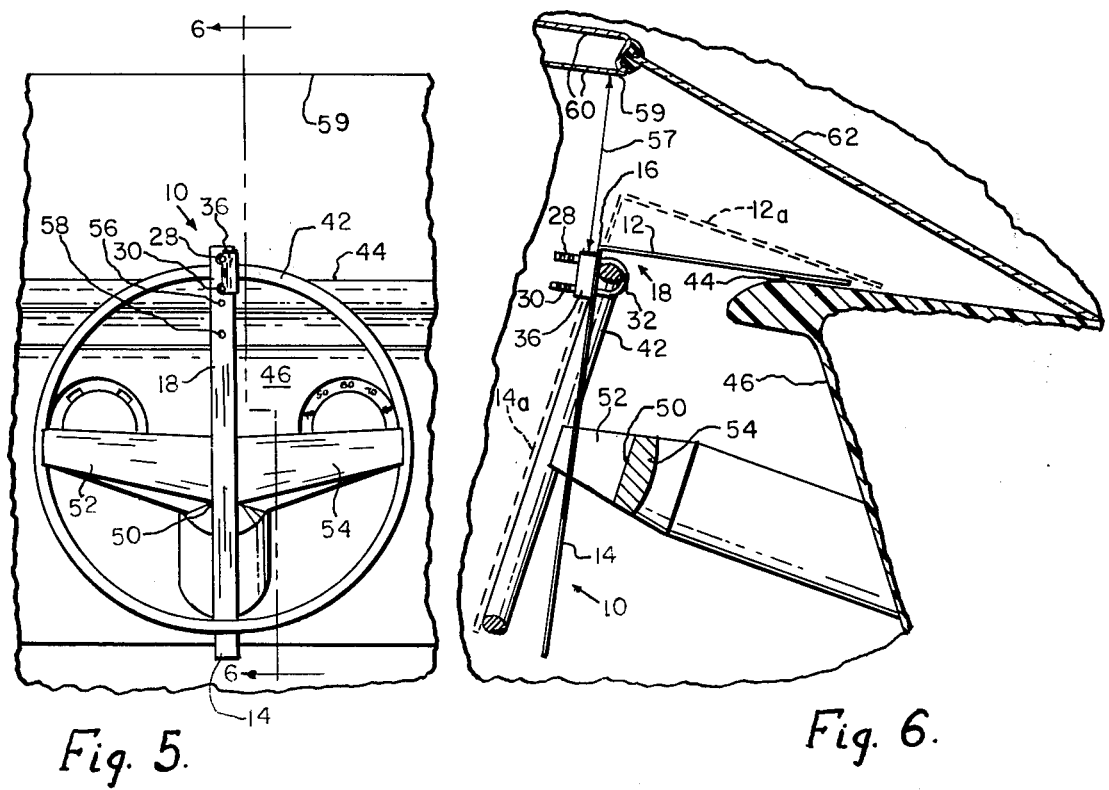

MOTOR VEHICLE ANTI-THEFT DEVICE

BACKGROUND OF THE INVENTION

1. Field of the Invention

This invention relates to a portable device for preventing theft of motor vehicles of the type having a steering wheel with steering wheel spokes and hub mounted in front of a panel having a top edge in proximate relation to the top of the steering wheel.

2. Description of the Prior Art

There have been invented in the past a variety of devices which attach to the steering wheel of a motor vehicle to deter thieves from stealing the vehicle. These anti-theft devices are unsatisfactory for various reasons. For example, U.S. Pat. Nos. 1,296,085; 1,170,987; 1,430,463 and 1,452,240 disclose non-portable anti-theft devices intended for original factory installation during manufacture and are not readily suitable for modern motor vehicles. They have been generally superceded by the current steering column conventional combined lock and ignition switch which when the key is removed breaks the ignition circuit and simultaneously prevents movement of the steering wheel.

However, as is well known, such steering column combined lock and ignition switch construction has not stopped the proliferation of motor vehicle theft. The cylinder of such steering column lock is vulnerable to even youthful amature thieves with the help of a commercially available tool originally designed for removal of dents in auto bodies and known as a "slapper". This tool has an 18 inch shaft with a tapered screw extending from one end and a 10 pound weight slidably mounted on the shaft. The thief screws the tapered screw tightly into the keyhole of the lock and then slaps the weight back sharply against a shoulder at the other end of the shaft. With three or four such sharp blows, the lock cylinder is torn out of the steering column lock which then is susceptible to a screwdriver being inserted to start the vehicle motor.

A quieter and less conspicuous procedure is customarily used by the thief to open a locked door of the vehicle. A thin, flat tool known as a "snake" is inserted between the top of the vehicle window and the rubber weatherstripping and then manipulated to unlock the door by lifting the latch button on the inside of the motor vehicle.

Because of the above described apparent ease with which a thief may enter and steal such vehicles, auxiliary anti-theft inventions have been devised. One such auxiliary anti-theft device is disclosed in U.S. Pat. No. 3,348,391 which involves a relatively cumbersome, non-portable arrangement having a metal band fastened around the seat of the vehicle and to which is slidably and rotatively mounted a plate structure which locks onto the steering wheel when the vehicle is parked and occupies a part of the seat at other times.

Two portable auxiliary anti-theft devices are disclosed in British patents Nos. 1,039,980 and 1,007,711 as variations of an elongated structure carrying hook formations on respective ends thereof for hooking over a spoke of the steering wheel and a control pedal respectively in the vehicle. A problem with these later two devices is that the hook at the control pedal is susceptable to being kicked off of some control pedals. And while these later two devices have the attribute of being portable and less difficult to install than those previously mentioned, they lack the installation ease and structural simplicity needed to encourage use each time the vehicle is parked. A further undesirable feature of these later two devices is that they are not easily visible from outside the vehicle when installed and therefor lack visual deterrence for influencing a thief to forego breaking into the vehicle.

Visual deterrence may be understood when it is realized that the previously described theft procedures of opening a locked vehicle door and removing the steering post lock cylinder reportedly may be carried out in the amazingly brief period of two minutes. Such time period is very important to a thief because the risk of being noticed and caught in the stealing act increases rapidly with time. Thus the thief is greatly influenced by his appraisal of the time required to perform the necessary unlocking and vehicle starting procedures. It therefor becomes desirable to not only provide a structurally simple and inexpensive auxiliary anti-theft device that requires a minimum of effort to install and remove by the owner, but also one which is highly visible through the windows from the outside of the vehicle and readily recognizable as being a difficult and time consuming impediment to the thief.

SUMMARY OF THE INVENTION

The present invention achieves such a structurally simple and inexpensive portable anti-theft device which involves only minimal time and effort to install and remove by a person having the needed key, but which is easily recognizable as being relatively invulnerable to removal without the key and is highly visible through the windows of the vehicle even at a substantial distance from the vehicle. One of the reasons which makes possible the structural simplicity and effectiveness of the present anti-theft invention is the advantageous use made by the invention of the top edge of the instrument panel or dashboard which appears in virtually all motor vehicles at approximately the same height as the top of the steering wheel.

A primary object of the present invention is the provision of a portable motor vehicle anti-theft device which with the use of a key is very easy to attach to the steering wheel to effectively prevent steering of the vehicle, and is very easy to remove from the steering wheel to restore steering capability of the vehicle.

A further object is the provision of a portable motor vehicle anti-theft device which when fixed to the steering wheel is highly visible through the windows of the vehicle from outside the vehicle and is invulnerable to an auto body dent remover tool known as a "slapper".

And further objects include the provision of a portable motor vehicle anti-theft device which is very simple in construction, is readily produced from commercially available components with only minor additional fabrication, and which may be easily stored under the seat of the vehicle for ready access when needed.

These and other objects, features and advantages of the present invention are achieved generally by the provision of an L shaped member in the form of a pair of legs extending from a common juncture, the legs being of a length such that when the L shaped member is on the steering wheel with the common juncture at the top of the wheel one of the legs overlaps the top edge of the dashboard or instrument panel and the other leg overlaps the steering wheel hub, and a structure for locking the L shaped member to the steering wheel.

By making the locking structure in the form of a U shaped member having two sides straddling the rim of the steering wheel and at least one of the sides having an extension extending through a hole in one of the legs with the U shaped portion about the steering wheel rim, and providing an arrangement for locking onto the side extension, a very simple and inexpensive locking structure for the motor vehicle anti-theft device is thereby achieved.

By making the U shaped member sides each with an extension extending through respective holes in the L shaped member and providing notches along each of the side extensions, a structure adapted for an inexpensive commercially available adjustable shackle type lock is thereby achieved as well as adjustability for locking onto steering wheel rims of different cross sectional dimension.

By making the L shaped member of steel covered with a bright colored rubber, flexible vinyl, or other suitable plastic, combined strength and protection against scratching of vehicle contact surfaces is thereby achieved as well as increased theft deterrence visibility from outside the vehicle when the invention is locked on the steering wheel.

These and other objects, features and advantages of the invention will be better understood from the following description taken in connection with the accompanying drawings of an illustrative embodiment of the invention and wherein:

FIG. 1 is a front view of a preferred embodiment of a motor vehicle anti-theft device in accordance with the present invention;

FIG. 2 is a side view of the FIG. 1 illustration;

FIG. 3 is a back view of the FIG. 1 illustration;

FIG. 4 is a cross sectional view to enlarged scale taken on line 4—4 of FIG. 2 to more clearly show construction;

FIG. 5 is a front view of a portion of the inside of a motor vehicle showing the steering wheel, instrument panel and windshield and the FIG. 1 anti-theft invention mounted on the steering wheel for preventing steering of the vehicle.

FIG. 6 is a cross sectional view taken on line 6—6 of FIG. 5 to more clearly show positioning of the various members.

DESCRIPTION OF THE ILLUSTRATIVE EMBODIMENT

Referring to the drawings in more detail, a preferred embodiment of a portable motor vehicle anti-theft device in accordance with the present invention is designated generally by the numeral 10. The motor vehicle anti-theft device 10 has a pair of legs 12 and 14 extending at right angles to each other from a common juncture 16 forming an L shaped member 18. The L shaped member 18 is preferably made of a single length of steel bent at the common juncture 16 to form the two legs 12 and 14 and may be case hardened or otherwise heat treated to provide added resistance to being cut or sawed. The steel portion of the L shaped member 18 appears in cross section as a steel core 20 (FIG. 4) covered in its entirety with a non scratching material 22 such as rubber, flexible vinyl or other suitable material, and preferably of a bright color to increase visibility of the L shaped member 18.

Close to the common juncture 16 are a pair of spaced apart holes 24 and 26 through the leg 14 and with their axes perpendicular to leg 14 and in a plane defined by the center of the legs 12 and 14. Holes 24 and 26 are for receiving parallel side extensions 28 and 30 respectively of a U shaped locking member 32. The side extensions 28 and 30 have along their respective lengths locking notches 34 for locking thereto a conventional lock body 36 which with the U shaped member 32 comprises a conventional commercially available adjustable shackle type lock having a removable key 38. The lock body 36 is preferably oriented so that the key 38 is at the juncture 16 end of the leg 14 for reasons to be hereinafter further described.

The length 40 of the leg 12 is such that when the common juncture 16 is at the top of the motor vehicle steering wheel 42 the leg 12 will overlap the top edge 44 of the instrument panel or dashboard 46 of the motor vehicle. The length 48 of the leg 14 is such that when the common juncture 16 is at the top of the steering wheel 42 the leg 14 will at least overlap the steering wheel hub 50 of the steering wheel 42 in those instances where the steering wheel spokes 52 and 54 carry the steering wheel 42 above the steering wheel hub 50 as in FIGS. 5 and 6. However, in those instances where the steering wheel spokes carry the steering wheel at the same level as the steering wheel hub the length 48 of the leg 14 is such that when the common juncture 16 is at the top of the steering wheel 42 the leg 14 will overlap both the bottom and the top of the steering wheel 42 as shown by broken lines $14_a$ in FIG. 6. In such instance a pair of holes 56 and 58 are provided in leg 14 to receive the U shaped member 32 so as to effect a repositioning of the L shaped member 18 on the steering wheel 42 so that the leg 12 will clear the top edge 44 of the panel 46 as shown by broken lines $12_a$ in FIG. 6. Thus the anti-theft device 10 may be attached to the steering wheel 42 with the leg 14 extending preferably beneath the bottom of the steering wheel 42 in those instances where the steering wheel 42 is carried above the level of the steering wheel hub 50 as shown in FIGS. 5 and 6. And in those instances where the steering wheel 42 is carried at the same level as the steering wheel hub 50 the leg 14 will rest above the bottom of the wheel 42 as shown by $14_a$. In each instance, nevertheless, the steering wheel 42 is prevented from being rotated to steer the motor vehicle because of the interference created by the leg 12 or $12_a$ and the top edge 44 of the instrument panel 46.

The lock body 36 is oriented so that the key 38 will always be inserted at the position adjacent the common juncture 16 because the distance 57 (FIG. 6) to the roof 59 formed by the sheet metal roof structure 60 carrying the top of the windshield 62 is substantially shorter than the eighteen inch length of the previously described auto body dent remover tool commonly used by thieves to remove lock cylinders. The shortness and inadequacy of the distance 57 for use of this tool on the lock body 36 is readily recognized by a thief's glance through the windshield 62 or other window of the motor vehicle and together with the bright color of the rubber coating 20 present an effective visual deterrent to a thief's decision to break into the vehicle.

When the owner of the motor vehicle wishes to restore steerability to the vehicle he simply inserts the key 38 in lock body 36 and unlocks the lock body 36 from the adjustable shackle 32 which is then removed from the holes 24 and 26 and the L shaped member 18 lifted away from the steering wheel 42. The adjustable shackle 32 may then be reinserted into holes 24 and 26 or holes 56 and 58 and the lock body 36 relocked onto the extensions 28 and 30 as shown in FIGS. 1 through 3, whereupon the portable anti-theft device 10 may be placed under the motor vehicle seat for convenient accessibility for again locking onto the steering wheel 42 when the motor vehicle is again parked and left unattended.

This invention is not limited to the particular details of construction and operation as equivalents will suggest themselves to those skilled in the art. For example, changing the angle between the legs 12 and 14 instead of repositioning the L shaped member 18 to the broken line positions $12_a$ and $14_a$ to clear the top edge 44 of the panel 46 is within the spirit and contemplation of the present invention.

What is claimed is:

1. In a device for preventing the theft of a vehicle of the type having a steering wheel with a steering wheel rim, steering wheel spokes and steering wheel hub mounted in front of a panel having a top edge in proximate relation to the top of said steering wheel, the combination of:
   a. an L shaped member in the form of a pair of legs extending from a common junction,
   b. said legs being of a length such that when said L shaped member is in operative position on said steering wheel with said common juncture at the top of said wheel, one of the legs overlaps said top edge of said panel by an amount such that the top of said panel is an obstruction to substantial rotary movement of said one of the legs in conjunction with rotary movement of said steering wheel and the other leg overlaps said steering wheel hub, and
   c. means for locking said L shaped member in said operative position to said steering wheel rim at the top of said steering wheel with said one leg overlapping said top edge of said panel and said other leg overlapping said hub and said means for locking includes at least one hole through one of said legs, a U shaped member having two sides for straddling the rim of said steering wheel and at least one of said sides having an extension extending through said hole, and a lock body which with said side extension includes means for locking onto said side extension in manner such that said U shaped member cooperates with said L shaped member to circumscribe said steering wheel rim and secure said first mentioned one of said legs to its overlapping position at the top of said panel.

2. The combination as in claim 1 wherein said means for locking includes two spaced apart holes through said L shaped member, said U shaped member having two sides for straddling the rim of said steering wheel with each of said sides having an extension extending through a respective one of said holes, and a lock body which with said side extensions include means for locking onto said side extensions in manner to prevent removal of said extensions from said holes and to secure said first mentioned one of said legs to its overlapping position at the top of said panel.

3. The combination as in claim 2 wherein both said holes are in said other leg.

4. The combination as in claim 3 wherein one of said holes is close to said juncture and said holes are in a plane substantially the same as that defined by a centerline through both of said legs.

5. The combination as in claim 4 wherein said other leg has another pair of spaced apart holes for receiving said extensions and at a distance from said juncture such that when said other leg overlaps said steering wheel hub said one leg clears and overlaps said top edge of said panel.

6. The combination as in claim 4 wherein each of said extensions has a plurality of locking notches and said lock body has holes for receiving the respective extensions and capacity to lock onto said extensions at respective locking notches in manner to hold said other sufficiently close to said steering wheel rim to secure said first mentioned one of said legs to its overlapping position at the top of said panel, and said lock body has a removable key for unlocking said lock body from said extension and is oriented for insertion of said key at the juncture end of said leg.

7. The combination as in claim 1 wherein said legs are of steel, and a protective covering over said legs for preventing scratching of surfaces of said vehicle contacted by said legs.

8. The combination as in claim 7 wherein said protective covering has a bright highly visible color finish for making said device highly visible through the vehicle windows when installed on the vehicle steering wheel.

9. The combination as in claim 8 wherein said protective covering is one of the group consisting of rubber, vinyl, leather and polyethylene.

* * * * *